Jan. 5, 1943.  H. ALLEN  2,307,346
STUFFING BOX
Filed Jan. 27, 1941
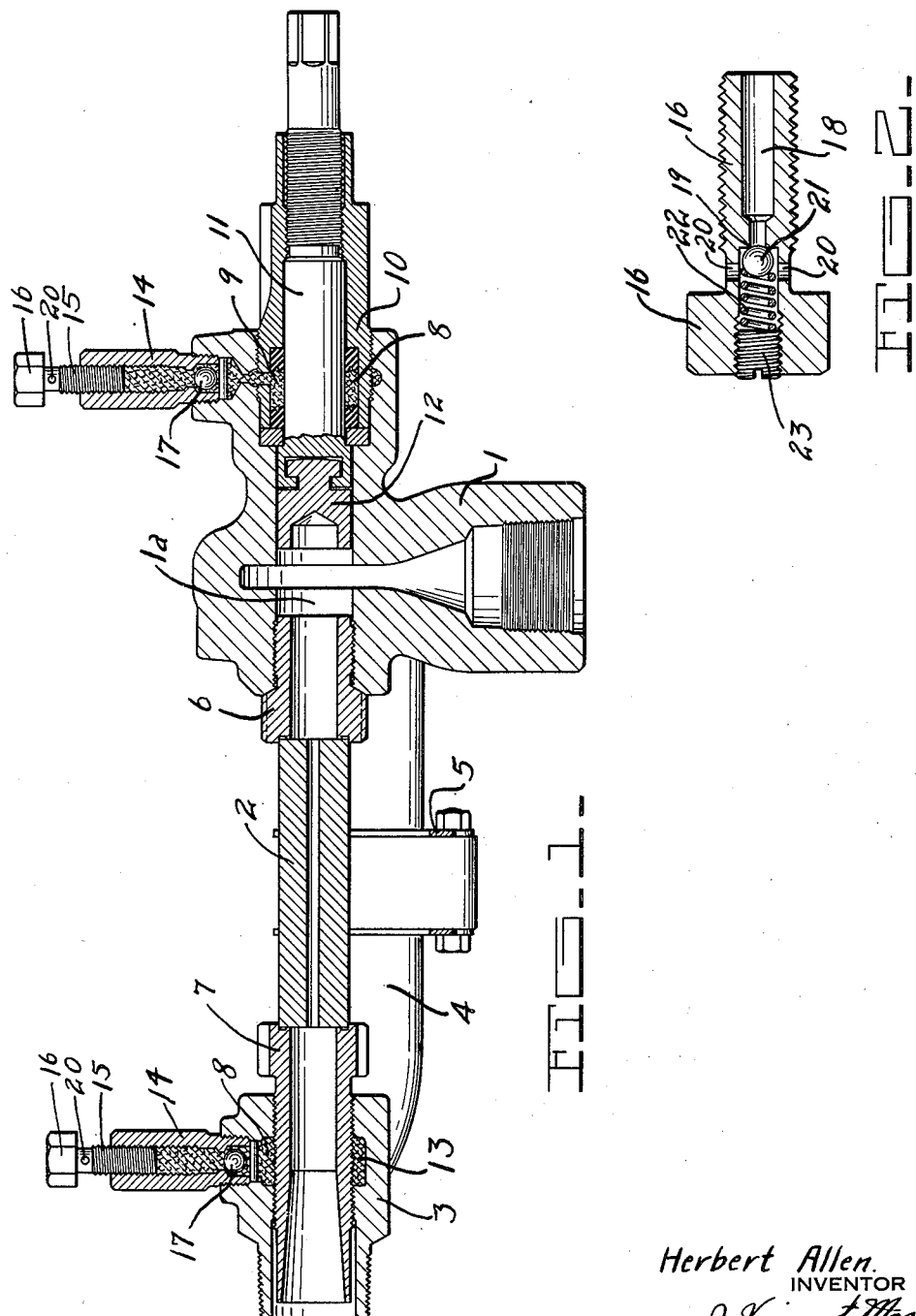
Herbert Allen.
INVENTOR
BY J. Vincent Martin
and
Ralph R. Browning.

Patented Jan. 5, 1943

2,307,346

UNITED STATES PATENT OFFICE 2,307,346

STUFFING BOX

Herbert Allen, Houston, Tex., assignor to Cameron Iron Works, Houston, Tex., a corporation of Texas Application January 27, 1941, Serial No. 376,128

2 Claims. (Cl. 286—38)

This invention relates in general to apparatus for packing joints wherein plastic packing material is employed and has for its general object the provision of a means for limiting the pressure in packing systems employing plastic packing material.

It has been found in practice that when a workman operates the threaded ram of a packing system employing plastic packing material to inject more packing material into the system to increase the pressure on the material in said system, there is a tendency for the workman to take up too much on the ram, thereby placing too great a pressure on the packing material. This results not only in difficult operation of the movable parts with which the packing forms a seal, but also results in excessive wear of said parts.

A more specific object of this invention is to provide means in a packing system employing plastic packing material to prevent the application of too great a pressure on the packing material contained therein.

Another object of this invention is to provide in a system containing a fluid or plastic substance, a ram which is incapable of exerting more than a predetermined maximum pressure.

A further object of this invention is to provide an adjustable means for limiting the amount of pressure which may be applied to the packing in a plastic packing system.

Still further objects will appear in the following description taken in connection with the appended drawing which illustrates an embodiment of the present invention.

In the drawing:

Fig. 1 is a horizontal sectional view of oil or gas well equipment provided with plastic packing systems embodying the present invention.

Fig. 2 is a longitudinal sectional view of a ram or plunger having a pressure relief valve embodied therein.

In Fig. 1 of the drawing, there is shown a structure in which the present invention is embodied. As illustrated, the fitting 1 is adapted to be connected to an oil or gas well so that flow from the well will take place through the fitting and choke 2 and thence through the part 3 of the fitting into the flow line (not shown) which is coupled to said part 3. The fitting 1 is integral with the part 3, the connection being indicated by reference character 4. Bifurcated rings 5 are adapted to resiliently receive and support the choke 2 while it is being clamped into position between the screw threaded members 6 and 7. Member 6 is adapted to be tightly screwed into position within bore 1a in the fitting 1 whereas the screw threaded member 7 is constructed and mounted within the part 3 for axial adjustment therein. The end faces of the members 6 and 7 are recessed to receive the ends of the choke 2, and in mounting the choke 2 in position, one end of the choke is placed into position in the recess of the member 6. The screw threaded member 7 is then rotated to cause the same to be axially displaced to engage the other end of the choke and clamp the same in position between the two members 6 and 7.

The bore 1a extends through the main portion of the fitting 1 in axial alignment with the aperture in the choke 2 and a valve member 12 is axially displaceably mounted within said bore. Said valve is adapted to be moved into seating engagement with the end of the member 6 to close off the flow of fluid from the well through the fitting 1 into the choke 2. A portion of the bore which receives the valve body 12 is enlarged and threaded to receive a bushing 10 which in turn has a portion provided with internal threads adapted to cooperate with the threads on a valve stem 11 which is connected with the valve body 12 and serves to displace said valve body to open and closed positions.

In order to prevent leakage about the adjustable clamping element 7, an annular recess 13 is provided within the part 3 about said element 7. Said recess communicates with a threaded port into which a fitting 14 is mounted. Said fitting 14 is in the form of a cylinder having a threaded bore therein adapted to receive a threaded ram or plunger 15 provided with a head 16 by means of which said ram may be rotated to cause the same to enter the fitting 14 and displace plastic packing material 8 contained therein into the annular recess 13 in order to seal the joint between the part 3 and the screw threaded member 7 against leakage. The lower end of the cylindrical fitting 14 is provided with a ball check valve 17 to prevent escape of the packing material therefrom upon removal of the ram 15.

The portion of fitting 1 which contains the bushing 10 and also the bushing 10 itself are provided with communicating annular recesses adapted to receive plastic packing material 8 to seal the bushing 10 within the fitting 1 and to seal the valve stem 11 within the bushing 10. The portion of fitting 1 surrounding the bushing 10 is provided with a threaded port for receiving a cylindrical fitting 14 identical to that shown mounted in the part 3.

As pointed out hereinbefore, there is a tendency on the part of workmen in tightening the rams or plungers corresponding to the plunger 15 shown in the drawing in order to put pressure on the packing to tighten them too much, thereby applying greater pressure to the plastic packing material than is necessary. As above stated, this causes excessive wear and difficult operation. In order to avoid overtightening of the ram 15, the latter, in accordance with the present invention, is provided with a spring loaded valve adapted to open when the pressure applied to the plastic packing material exceeds a predetermined value.

In Figure 2 of the drawing, one construction of the ram 15 is shown which will operate to avoid the above pointed out disadvantages. As shown, the ram 15 is provided with a bore 18 extending axially therethrough. Bore 18 is constricted midway between the ends of the ram 15 to form a valve seat 19. The portion of the bore 18 between the valve seat and the head of said ram is provided with ducts or ports 20, which place said bore in communication with the exterior of the ram 15. A valve body 21 shown in the form of a ball is mounted in the bore 18 and is adapted to be seated upon the seat 19. A helical coil spring 22 is positioned in the bore 18 and has one end engaging the ball valve 21 to urge the latter upon the seat 19. The head end of the bore 18 is threaded to receive a screw 23 which engages the other end of the spring 22 and is adjustable to vary the degree of compression of the spring 22 and the force applied by said spring urging the valve 21 on to its seat 19.

With this construction, when the ram 15 is rotated to cause the same to enter the cylindrical fitting 14, the plastic packing material will be displaced from the cylinder 14 into the joint to be sealed until the pressure exerted upon said plastic packing exceeds the force exerted by the spring 22 on the ball valve holding the latter upon its seat. When said pressure is exceeded, the valve 21 will be moved from its seat, and any further displacement of the ram into the cylinder 14 will merely cause the plastic packing material to flow through the bore 18 out through the ports or ducts 20. Thus, excessive pressure of the plastic packing material within the packing system will be avoided.

From the foregoing description, it will be realized that the present invention solves a practical problem standing in the way of the full exploitation of plastic packing systems and removes the human element heretofore involved in the degree of pressure placed upon plastic packing and the difficulties resulting therefrom.

Having described my invention, I claim:

1. A stuffing box for plastic packing comprising a housing having a bore extending therethrough, the wall of said bore having a circumferentially extending recess therein, said housing having a socket therein communicating with said bore, a cylinder having an axial bore formed therein and having one end mounted in said socket, the axial bore in said cylinder at the end mounted in said socket having a valve seat formed therein, a valve positioned on said seat, a pressure applying ram operatively mounted in the bore of said cylinder, said pressure applying ram comprising a body having a pressure applying end face and a head, said body having a bore extending axially therethrough and a cross duct extending transversely therethrough adjacent the head, said bore having a constriction between the cross duct and the pressure applying end face to form a valve seat, a valve in the head end of said bore, a spring having one end engaging said last-recited valve, and a screw threadedly adjustably mounted in the head end of said bore and engaging the other end of said spring to vary the force exerted by said spring on the last-recited valve urging the latter on its seat.

2. A stuffing box for plastic packing comprising a housing having a bore extending therethrough, the wall of said bore having a circumferentially extending recess therein, said housing having a socket therein communicating with said bore, a cylinder having an axial bore formed therein and having one end mounted in said socket, the axial bore in said cylinder at the end mounted in said socket having a valve seat formed therein, a valve positioned on said seat, a pressure applying ram operatively mounted in the bore of said cylinder, and yieldable means in contact with the plastic packing at the region of application of pressure thereto by the ram for yielding under a predetermined maximum pressure on said plastic packing.

HERBERT ALLEN.